United States Patent

[11] 3,562,449

[72] Inventor Henry A. Quick
3413 Tal-Heim Circle, Birmingham, Ala. 35216
[21] Appl No 692,801
[22] Filed Dec. 22, 1967
[45] Patented Feb. 9, 1971

[54] PROCESS AND APPARATUS FOR TESTING TELEPHONE SELECTOR CIRCUITS AND THE LIKE
2 Claims, 1 Drawing Fig.

[52] U.S. Cl. .... 179/175.21
[51] Int. Cl. .... H04m 3/22
[50] Field of Search .... 179/175, 175.2, 175.21

[56] References Cited
UNITED STATES PATENTS
1,543,933 6/1925 Lundius .... 179/175.21
1,582,948 5/1926 Walters et al. .... 179/175.21
2,006,472 7/1935 Miller .... 179/175.2
2,234,272 3/1941 Morrow .... 179/175.2

*Primary Examiner*—Kathleen H. Claffy
*Assistant Examiner*—David L. Stewart
*Attorney*—Jennings, Carter and Thompson

ABSTRACT: Process and apparatus for testing the continuity and polarity of telephone selector trunk lines and the operation of the dial responsive relay in selectors wired to such trunk lines. A current limiting test circuit adapted to selectively pass current a selected direction only is directly connected between the tip and ring wiper contacts of a selector switch connected to dialing apparatus, the "cut through" or "D" relay being blocked open. The sleeve wiper contact is connected to a battery through a current indicating device such as a lamp.

PATENTED FEB 9 1971 3,562,449
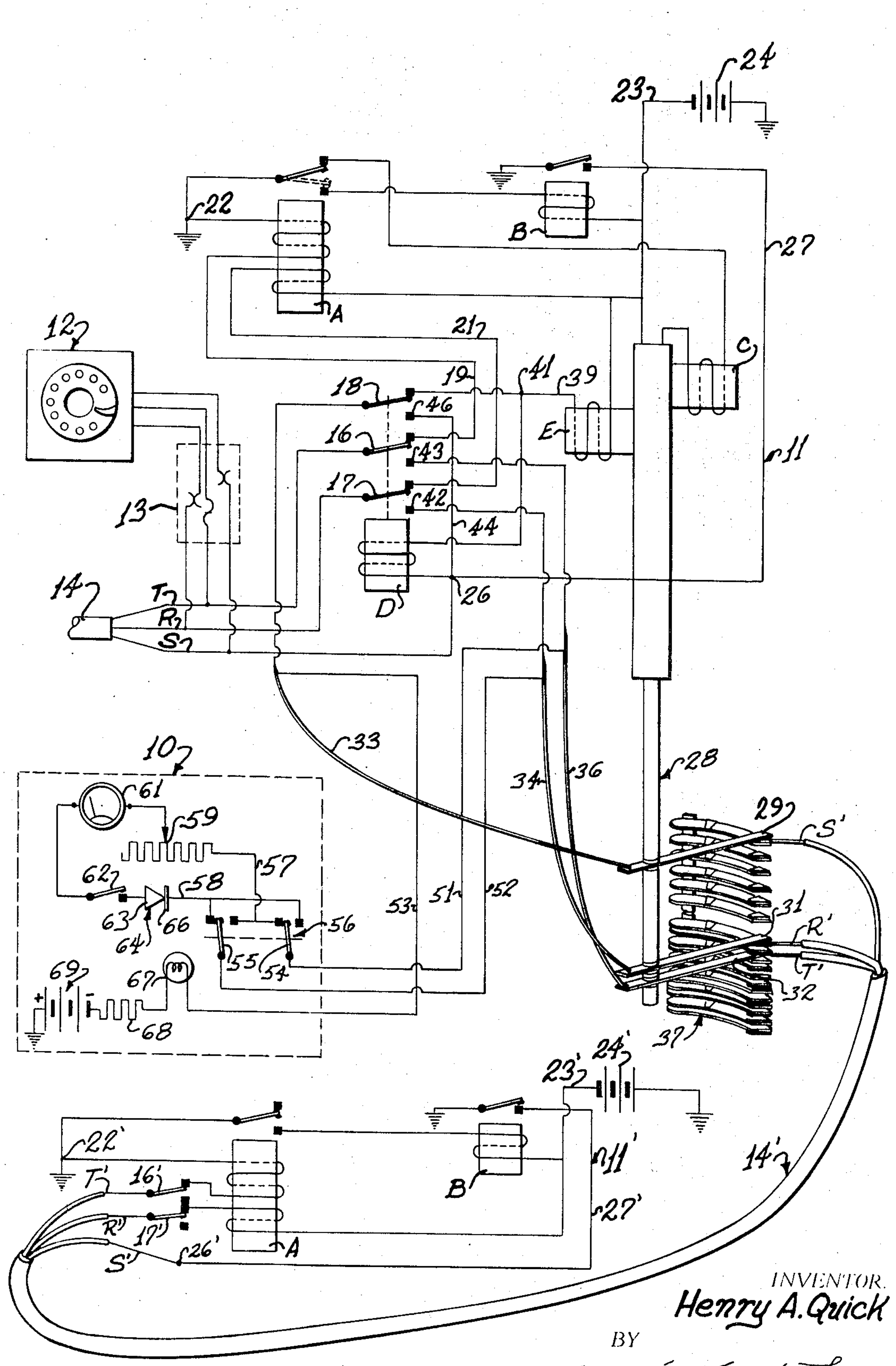
INVENTOR.
Henry A. Quick
BY
Jennings, Carter & Thompson
Attorneys

PROCESS AND APPARATUS FOR TESTING TELEPHONE SELECTOR CIRCUITS AND THE LIKE

BACKGROUND OF THE INVENTION

The common telephone selector circuit comprises a plurality of selector switches, each having access to ten sets or levels of ten three conductor trunk lines. The three conductors of the trunk lines are commonly referred to as the "tip," "ring" and "sleeve" conductors because of the contacts to which each is wired in the common telephone connection jack. This terminology may also be extended to the various circuits and components to which each conductor is wired. Thus, reference may be had to "tip," "ring" or "sleeve" circuit-contact and so on. Each trunk in turn is wired to another selector switch in turn having access to ten more sets of ten trunk lines. That is to say, there are 300 fixed contacts in each selector switch, disposed so that there are 100 sets of three contacts, each set being connected to one trunk line. These sets are arranged on 10 levels of 10 sets each, one level for each digit on the usual telephone dial.

A movable set of three contacts is provided with suitable operating equipment, described below, which operates to move the movable set to a level corresponding to the number dialed and further to move these contacts into contact with a set of the fixed contacts which are wired to a trunk not in use. The input trunk is wired through the selector mechanism to the movable contacts. Thus, for each digit which may be dialed the selector has access to 10 trunk lines. Since each trunk line connects the input of one selector to the output of many other selectors, each selector operates not only to make a connection corresponding to the number dialed, but also to make connection to idle equipment so that the signals transmitted do not become mixed.

Each selector switch is operated by a set of relays at least one of which operates in response to interruptions in the electric signal supplied. These interruptions are the dial pulses provided by a telephone dial or similar signal device.

In a common form of selector switch there are five such relays, often designed A, B, C, D, and E relays. The A relay is the primary dial response relay and releases and reoperates in response to each dial pulse. The B relay is the "ground" or holding relay and is controlled by the A relay. However, the B relay has a built in time delay so that release and reoperation of the A relay in response to dial pulses does not affect the B relay. The operation of the B relay supplies a "ground" or "-busy signal" to the preceding equipment, as will appear hereinafter. The C relay operates to prevent rotation of the wiper contacts while release and reoperation of the A relay operates a magnet and pawl mechanism to "step" the selector to a level corresponding to the number of pulses provided (i.e.), the number dialed). When the contacts of the selector switch have been stepped to the desired level the C relay releases and allows the wiper contacts to rotate to the first set of contacts. If the sleeve circuit wired to this set of contacts is open, relay D will operate, connecting the tip, ring and sleeve conductors of the input trunk to the tip, ring and sleeve contacts of the selector switch, thus extending the circuit to another selector switch and ultimately to the dialed subscribers equipment. However, if the sleeve circuit wired to the first set of relays is not open, that is, presents a ground signal, then the E relay operates to rotate the movable contacts to the next set of contacts. The D relay will then operate if the second sleeve conductor is open, otherwise, the E relay will operate until a set of contacts with an "open" sleeve line is located.

Relay A has a winding from the voltage supply through a set of normally closed contacts of relay D to the ring conductor of the input trunk to the selector. The tip conductor is wired through another set of normally closed contacts of relay D to another winding of relay A, and thence to ground. The dial pulsing apparatus up the line from the selector is connected between the tip and ring conductors to complete the circuit from battery to ground through relay A without the necessity of a power supply at the dialing point.

Relays D and E are wired together and so balanced that a ground on the output sleeve lead will shunt relay D and allow relay E to operate. However, an open output sleeve lead will allow relay D to operate thus "cutting through" the ring, tip and sleeve inputs, extending them to the input of succeeding equipment.

When the tip-ring circuit is completed properly the A relay of the newly connected selector operates, thus causing the B relay to operate to put a ground voltage on the back sleeve line. This ground condition will signal all other selectors wired to the trunk that it is in use. That is to say, the ground on the sleeve line will shunt the D relay of any selector switch that attempts to make connection with the trunk in use, thus to cause the E relay of that selector to operate thus rotating the movable contacts to contacts wired to a different trunk.

In view of the foregoing it is clear that if the tip, ring or sleeve conductor of any of the many interoffice trunk lines is open (i.e., not continuous), or if the tip conductor of one trunk is crossed to ground or the tip conductor of another trunk, or if the ring conductor of one trunk is crossed with the ring conductor of another trunk the apparatus will malfunction when it attempts to use such a faulty trunk resulting in a wrong number, call failure or, at the least, noise or "crosstalking" on the call circuit. Furthermore, in the event that the dial response of A relay of the selector connected to the trunk in use is too stiff, that is, fails to operate at the proper current level, a call failure or wrong number will result.

To insure that each conductor of each interoffice trunk line is continuous and has the correct polarity and that the A relays of the selector, connector, repeater or similar apparatus associated with each trunk will function properly, it is necessary periodically to test each trunk and its associated equipment. Prior methods of carrying out these necessary tests, so far as I am aware, have involved testing the response of each A relay as a separate operation from testing the trunk lines for continuity and polarity. Furthermore, the technician using prior testing apparatus was required to perform separate operations for each trunk line that he was testing regardless of whether or not it was faulty. Also, prior art testing devices have been connected to the selector under test through the usual test jack supplied with the selector and thus have required operation of all of the various elements of the selector, including those which are not critical. Thus the performance of the tests using prior art methods and apparatus required a considerable amount of time. It is, therefore, a primary object of my invention to provide a process and apparatus for rapidly testing the selectors and their associated trunk lines.

It is a further object of my invention to provide a process and apparatus for detecting abnormalities in the trunk lines and related equipment and to provide means for indicating the specific disorder detected.

BRIEF SUMMARY OF THE INVENTION

To carry out the above and other objectives, I provide means to connect the ring and tip circuits of a given selector switch to a current limiting circuit provided with means selectively to pass current in only one of either of the two possible directions, together with means to connect the sleeve circuit to current indicating means and a voltage supply such as a battery. Dialing apparatus of the usual type is connected to the input of the given selector switch by means of the usual test jack provided on such switches. The "cut through" or D relay is blocked in its nonoperated position by some means, such as a nonconductive member placed between the operating parts of the relay, or a blocking circuit. The movable contacts are directed to the first level of contacts by using the dialing apparatus, thus connecting the selector through the first trunk to another selector. If this first trunk is in use, the ground on the sleeve lead will operate the E relay and thus rotate the movable contacts to the next set of fixed contacts on the level being tested.

If, however, the first trunk is not in use and the trunk line is continuous and has the correct polarity, a current will flow from battery through the ring winding of the A relay of the selector switch having the trunk in question as its input, through normally closed contacts of the D relay to the ring input, through the ring conductor of the trunk to the fixed contacts of each selector wired to the trunk, one of which is the selector to which the test circuit is connected. Thus current passes through ring contacts to the test circuit, thence to the tip contacts, through the trunk to another set of normally closed contacts of the D relay, thence through windings on the A relay to ground. If the A relay is working properly, the current passed by the test circuit will be sufficient to operate it and supply current to the B relay which operates to ground the sleeve circuit, thereby operating the E relay of the selector to which the test circuit is connected. Operation of the E relay moves the wiper contacts to the next set of fixed contacts where the process is repeated until each of the 10 trunks and the A relays of their associated selector switches have been tested. The wiper contacts then fall to their ready position and the technician dials the selector to the next level, the process is repeated until the trunks connected to the selector and the A relays associated therewith are checked. In the event that a trunk is discontinuous or the conductors thereof are crossed, or the A relay associated therewith does not operate properly, the wiper mechanism will stop on the contacts of the faulty trunk. The technician then makes certain observations and performs certain operations with the test circuit, as will be more fully described hereinafter, to determine exactly what is wrong with the circuit. He then manually operates the contacts of the E relay to rotate the wiper contacts to the next set of fixed contacts and thus continues the test.

In the following description of my invention reference will be had to the accompanying drawing, forming a part of this application in which a common telephone selector circuit is diagrammatically shown in association with my improved testing apparatus, certain parts being omitted, and other parts being broken away for the sake of clarity.

Referring now to the drawing for a better understanding of my invention I show my improved test circuit generally at 10. A selector circuit to which my test circuit is connected as will be described hereinafter is shown generally at 11. A common hand dial set is shown at 12 and is connected to the selector circuit 11 by means of the test jack 13.

At 14 I show the input trunk line to the selector 11. This input trunk line 14 comprises three conductors designated by the letters T, R and S, being the tip, ring and sleeve conductors, respectively. The relay designated D is the "cut-through" relay of the selector switch. Its function is to direct the signals of the incoming tip, ring and sleeve conductors to the output tip, ring and sleeve conductors selected by the apparatus. The outgoing tip, ring and sleeve conductors are indicated by the letters T′, R′ and S′, respectively. It will be understood that there are one hundred such sets of output tip, ring and sleeve conductors connected to the output side of the selector switch.

As shown in the drawing the tip and ring input conductors are respectively connected to movable contacts 16 and 17, which are under the control of the relay D, as is the movable contact 18. When the relay D is in its relaxed or unoperated position the contacts 16 and 17 connect the tip and ring input conductors to leads 19 and 21 respectively. Lead 19 is connected to a winding of the relay A and thence to ground as indicated at 22 while lead 21 is connected to another winding of the relay A and thence through lead 23 to the negative side of a battery indicated generally at 24. It should be noted that the system is set up with a positive ground, as is common for telephone circuits.

Relay A is the dial responsive relay, and controls relays B and C. Relay B is the ground of busy signal relay, and operates to supply a ground to the point 26 through lead 27 when relay A operates. Relay C on the other hand operates to prevent rotation of the selector mechanism while release and reoperation of relay A positions the selector switch to be described hereinafter at a level which corresponds to the number dialed by the customer, in which case the signal comes through the trunk line 14. An operator dialing the hand dial set 12 will provide a dial signal through the jack 13. The ground supplied by the relay B through line 27 to point 26 operates as a busy signal along the sleeve conductor S since that conductor is connected to the circuit at the point 26. Under control of the relays C and E is the selector switch proper, indicated generally by the numeral 28. The switch 28 comprises a set of three wiper contacts indicated by the numerals 29, 31 and 32. These wiper contacts are connected by means of leads 33, 34 and 36 to the control relay circuit as will be described hereinafter. A bank of fixed contacts is indicated generally by the numeral 37. The bank of fixed contacts 37 comprises a plurality of contacts arranged on a plurality of levels, one level corresponding to each number which may be dialed to control the circuit. That is to say, in the usual telephone selector switch there are ten levels of contacts, 10 trunk lines being wired to successive sets of contacts on each level. Thus when a digit is dialed the signal resulting causes the wiper contacts 29, 31 and 32 to step up to a level corresponding to the digit dialed, whereupon the wiper automatically rotates to the first set of three contacts on that level. For the sake of clarity I have only shown six levels of contacts, and have broken away the bank of contacts so that only two sets of three contacts each are shown for each level.

The E relay is connected through lead 38 to the lead 23 and thence to the battery 24. The other side of this relay is connected through lead 39 to the point 41. The lead 33 from the sleeve wiper 29 is connected through movable contacts 18 of relay D to the point 41. Relay D is also connected to point 41, the other side of the winding of the relay D being connected to point 26. Thus the relay D receives its power supply through the relay E. The lead 34 from the ring wiper contact 31 is connected to a normally open contact 42 which is in position to be contacted by the movable contacts 17 upon operation of the relay D. Similarly lead 36 from the tip wiper contact 32 is connected to a normally open contact 43 which is in position to be contacted by the movable contact 16 upon operation of the relay D. Point 26 is connected through lead 44 to the normally open contact 46 in position to be contacted by the movable contact 18 upon operation of the relay D. Thus the relay D serves upon operation to connect the input tip, ring and sleeve leads to the output tip, ring and sleeve conductors through the circuit outlined above.

The output trunk line indicated generally by the numeral 14′ is connected to a selector switch having a circuit similar to the one just described. However, for the sake of clarity I have only shown those parts of the second selector circuit as are subject to be tested through the trunk line 14′. Since the second selector switch is substantially the same as the one just described I have designated corresponding parts with prime numbers and letters corresponding to those of the circuit just described, and hence no further description thereof is deemed necessary.

Turning now to a description of my improved test circuit I show input leads 51, 52 and 53 to the test circuit indicated generally at 10. Lead 51 is connected to the tip wiper lead 36, while lead 52 is connected to the ring wiper lead 34, and lead 53 is connected to the sleeve wiper lead 33 by some convenient means such as alligator clips or the like.

The leads 51 and 52 are connected to the movable elements 54 and 55 of a double-throw double-pole switch indicated generally at 56. In the position shown switch 56 connects lead 51 to a lead 57 and lead 52 to a lead 58. When moved to the other position the switch will connect the lead 52 to the lead 57 and the lead 51 to the lead 58 thus reversing the input to the circuit now to be described. The lead 57 is connected to a rheostat 59 which is in turn connected to a milliammeter 61. The milliammeter is connected to a switch 62 which is in turn connected to the anode 63 of a diode indicated generally by the numeral 64. The cathode 66 of the diode 64 is connected to the lead 58 just described. The diode 64 may be transistor diode as indicated, or it may be a vacuum tube diode or other directionally responsive current controlling device such as a polarized relay. The function of the diode 64 is to allow current to pass in only one direction whereby the circuit is open to current flowing in the opposite direction.

The lead 53 which is connected to the sleeve wiper lead 33 is connected to a lamp 67 and thence to a current limiting resistor 68 and the negative side of a battery 69.

In operation, the test circuit 10 is connected to leads between the selector switch control circuit 11 and the wiper contacts 29, 31 and 32. That is to say the leads 51, 52 and 53 are connected respectively to leads 36, 34 and 33 by some means such as alligator clips or the like. The hand dial set 12 is connected by means of the jack and jack plug indicated at 13 to the input side of the selector switch control circuit 11. The rheostat 59 is set so that a predetermined amount of current is allowed to flow through the circuit. The technician blocks relay D in its relaxed or nonoperative position by some means, such as a blocking circuit or a nonconductive member such as a toothpick placed between the contacts of the relay D. The circuit is now set up for testing. The technician dials a "1" on the hand test set 12 which sets the circuit in operation causing the wipers to move to the first level or stationary contacts in the bank 37. The wipers automatically rotate to the first contact position, second contact position and so on so long as the trunk lines connected to each of the sets of contacts are continuous, have the correct polarity, and are connected to a selector switch in which a relay is properly operated. When the wiper contacts 29, 31 and 32 have made connection with each of the contacts on the first level of the bank 37 the selector switch stops on the eleventh position, which has no trunk connection. The operator then opens the control circuit through the dial set 12 and the switch drops to its ready position and the operator then dials the numeral 2 and the process is repeated with each successive level. In the drawing I show the wiper contacts 29, 31 and 32 as having stopped on the second set of contacts in the sixth level of the fixed contact bank 37. This will result when one of five condition obtains with respect to the trunk line 14' and the selector switch circuit 11'. These five conditions are: (1) a stiff A relay, (2) reversed tip and ring conductors in the trunk line, (3) an open tip or ring conductor in the trunk line, (4) a tip conductor crossed with ground or another tip conductor or a ring conductor crossed with another ring conductor, and (5) an open sleeve conductor. In order to determine which of these conditions obtains the technician follows the routine described below. First, note the value indicated by milliammeter 61 and whether or not the light 67 is on. In all cases where the trouble is in the trunk line or the A relay connected thereto the light 67 will be off.

When the milliammeter reading is the same as the original value, either condition (1) or (5) described above obtains. If increasing the amount of current passed by the test circuit by adjusting the rheostat 59 causes the wiper contacts to move off of the fixed contacts (i.e., causes the A relay to operate), then the difficulty is a stiff A relay in the selector connected to the trunk line, (condition 1). On the other hand, if such an increase in current does not cause rotation of the switch wipers, the difficulty is an open sleeve conductor, (condition 5).

When the milliammeter reading is zero either condition (2) or (3) described above obtains. If the tip and ring conductors are reversed the diode 64 holds the circuit open and relay A does not operate. Thus, if operation of the switch 56, whereby the input and output of the test circuit and diode are reversed, causes the switch wipers to rotate to the next set of contacts, the difficulty is, clearly, reversed tip and ring conductors, (condition 2). On the other hand, if operation of the switch 56 has no result, then the difficulty is an open tip or ring conductor, (condition 3). 4). When the milliammeter reading is one to two milliamps above the original value set by the rheostat a tip conductor crossed with ground or another tip conductor or a ring conductor crossed with another ring conductor is indicated (condition 4).

After determination of the cause of the fault in the trunk or A relay, relay E of the selector to which the test circuit is connected is manually operated to rotate the wipers to the next set of contacts thus to resume the tests.

From the foregoing it is clear that I have devised a new and improved process and apparatus for testing telephone selector circuits. My invention has been successfully used to test telephone selector circuits at the rate of approximately 70 to 80 seconds for each selector switch and related circuit through which the test circuit is connected. Thus the technician is able to test 100 A relays and 300 trunk conductors in a little over a minute. Furthermore, the technician is then able to pinpoint exactly what the difficulty is and thus expedite corrective measures. My improved testing circuit is simple, durable and inexpensive. Its use requires only a minimum of prior training, and the results produced are a positive indication of the condition of the circuits tested.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

I claim:

1. In a process for quickly testing telephone switching equipment having a motorized multiple contact switch under control of a pulse responsive relay and a cut-through relay, which switch may be selectively placed in circuit through trunk lines with subsequent equipment, the steps of:
   a. holding the cut-through relay in its nonoperated position;
   b. operating said switch through the motorized devices associated therewith whereby said subsequent equipment is sequentially placed in circuit with said switch;
   c. sensing the integrity of and polarity of current flow through said switch;
   d. sensing the integrity of the connections between said switch and said subsequent equipment;
   e. stopping the operation of said switch whenever:
      1. any of said circuits leading to the subsequent equipment are discontinuous, or
      2. when current in said circuits flows in other than a predetermined direction, or
      3. when any of said circuits are short circuited, and
   f. whereby said switching equipment may be checked by energizing the driving devices associated with said switch, thereby eliminating manual movement of said switch from position to position.

2. For use in testing telephone selector, repeater and connector equipment which includes a multicircuit selector switch having tip, ring and sleeve conductors and controlled by pulse responsive and rotary stepping relays and a cut-through relay:
   a. a test circuit including in series:
      1. a selectively variable resistance element,
      2. a current indicating device, and
      3. means to permit current to flow in one direction only,
   b. means to connect said one way current flow means, said variable resistance element and said current indicating device in series with the outgoing tip and ring of said multicircuit switch; and
   c. means to hold said cut-through relay in its nonoperated position whereby the outgoing tip, ring and sleeve of said multicircuit switch are held out of circuit relative to the incoming tip, ring and sleeve of said multicircuit switch and to maintain the connection of the outgoing sleeve conductor to the winding of said rotary stepping relay, thus to test for continuity, polarity and integrity of the trunks and the operability of succeeding relay equipment.